United States Patent
Teoh et al.

(10) Patent No.: US 12,415,281 B2
(45) Date of Patent: Sep. 16, 2025

(54) ROBOTIC MEAL-ASSEMBLY SYSTEMS AND ROBOTIC METHODS FOR REAL-TIME OBJECT POSE ESTIMATION OF HIGH-RESEMBLANCE RANDOM FOOD ITEMS

(71) Applicant: NANYANG TECHNOLOGICAL UNIVERSITY, Singapore (SG)

(72) Inventors: Yee Seng Teoh, Singapore (SG); Yadan Zeng, Singapore (SG); Boon Heng Elvin Toh, Singapore (SG); Choon Yue Wong, Singapore (SG); I-Ming Chen, Singapore (SG); Guoniu Zhu, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 130 days.

(21) Appl. No.: 18/557,125

(22) PCT Filed: May 12, 2022

(86) PCT No.: PCT/SG2022/050312
§ 371 (c)(1),
(2) Date: Oct. 25, 2023

(87) PCT Pub. No.: WO2022/240363
PCT Pub. Date: Nov. 17, 2022

(65) Prior Publication Data
US 2024/0246240 A1    Jul. 25, 2024

(30) Foreign Application Priority Data
May 12, 2021   (SG) ............................ 10202105019T
May 12, 2021   (SG) ............................ 10202105020X

(51) Int. Cl.
*B25J 9/16* (2006.01)
*B25J 11/00* (2006.01)
(Continued)

(52) U.S. Cl.
CPC ......... *B25J 9/1697* (2013.01); *B25J 11/0045* (2013.01); *B65B 5/12* (2013.01);
(Continued)

(58) Field of Classification Search
CPC .... B25J 9/1697; B25J 11/0045; B25J 9/0093; B25J 9/1679; B25J 11/00; B65B 5/12;
(Continued)

(56) References Cited

U.S. PATENT DOCUMENTS 11,731,792 B2 *  8/2023  Menon .................... B65B 57/00
                                                      53/445
2020/0094997 A1   3/2020  Menon et al.
(Continued)

FOREIGN PATENT DOCUMENTS

CN    205837254 U    12/2016
CN    109919008 A     6/2019
(Continued)

OTHER PUBLICATIONS

Y. Makiyama, Z. Wang and S. Hirai, "A Pneumatic Needle Gripper for Handling Shredded Food Products," 2020 IEEE International Conference on Real-time Computing and Robotics (RCAR), Asahikawa, Japan, 2020, pp. 183-187.
(Continued)

Primary Examiner — Rachid Bendidi
(74) Attorney, Agent, or Firm — BakerHostetler

(57) ABSTRACT

Methods, systems and computer readable media are provided for automatic kitting of items. The system for automatic kitting of items includes a robotic device, a first imaging device, a computing device and a controller. The
(Continued)

robotic device includes an arm with a robotic gripper at one end. The first imaging device is focused on a device conveying kitted items. The computing device is coupled to the first imaging device and is configured to process image data from the first imaging device. The computing device includes item arrangement verification software configured to determine whether each item desired to be in the kitted items is present or absent in the kitted items in response to the processed image data from the first imaging device and generates data based on whether an item desired to be in the kitted items is absent from the kitted items. The controller is coupled to the computing device to receive the data from the computer representing whether an item desired to be in the kitted items is absent from the kitted items. The controller is also coupled to the robotic device for providing instructions to the robotic device to control movement of the arm and the robotic gripper, wherein at least some of the instructions provided to the robotic device are generated in response to the item desired to be in the kitted items being absent from the kitted items.

18 Claims, 16 Drawing Sheets

(51) Int. Cl.
  *B65B 5/12* (2006.01)
  *B65B 57/14* (2006.01)
  *B65G 47/90* (2006.01)
  *G06T 7/50* (2017.01)
  *G06T 7/70* (2017.01)
  *G06V 10/764* (2022.01)
  *G06V 10/82* (2022.01)
  *G06V 20/68* (2022.01)
(52) U.S. Cl.
  CPC .............. *B65B 57/14* (2013.01); *B65G 47/90* (2013.01); *G06T 7/50* (2017.01); *G06T 7/70* (2017.01); *G06V 10/764* (2022.01); *G06V 10/82* (2022.01); *G06V 20/68* (2022.01); *G06T 2207/30128* (2013.01); *G06V 2201/06* (2022.01)
(58) Field of Classification Search
  CPC ...... B65B 57/14; B65G 47/90; B65G 47/905; B65G 2203/041; B65G 47/904; G06T 7/50; G06T 7/70; G06T 2207/30128; G06V 10/764; G06V 10/82; G06V 20/68; G06V 2201/06; G05B 2219/40013; G05B 2219/50162
  See application file for complete search history.

(56) References Cited

U.S. PATENT DOCUMENTS

2020/0095001 A1* 3/2020 Menon .................. B25J 9/0093
2020/0096599 A1* 3/2020 Hewett ................. G07G 1/009

FOREIGN PATENT DOCUMENTS

CN     110641787 A     1/2020
CN     112061748 A     12/2020

OTHER PUBLICATIONS

R. Sam and N. Buniyamin, "A Bernoulli principle based flexible handling device for automation of food manufacturing processes," 2012 International Conference on Control, Automation and Information Sciences (ICCAIS), Saigon, Vietnam, 2012, pp. 214-219.

H. Wang, D. Sahoo, C. Liu, E. Lim and S. C. H. Hoi, "Learning Cross-Modal Embeddings With Adversarial Networks for Cooking Recipes and Food Images," 2019 IEEE/CVF Conference on Computer Vision and Pattern Recognition (CVPR), LongBeach, CA, USA, 2019, pp. 11564-11573.

A. Collet, M. Martinez, and S. S. Srinivasa, "The moped framework: Object recognition and pose estimation for manipulation", International Journal of Robotics Research (IJRR), 30(10):1284-1306, 2011.

A. Zeng et al., "Multi-view self-supervised deep learning for 6D pose estimation in the Amazon Picking Challenge," in IEEE International Conference on Robotics and Automation (ICRA), Singapore, 2017, pp. 1386-1383.

W. Wu and J. Yang, "Fast food recognition from videos of eating for calorie estimation," in 2009 IEEE International Conference on Multimedia and Expo, New York, NY, USA, 2009, pp. 1210-1213.

S. Rusinkiewicz and M. Levoy, "Efficient variants of the ICP algorithm," Proceedings Third International Conference on 3-D Digital Imaging and Modeling, Quebec City, QC, Canada, 2001, pp. 145-152.

A. S. Periyasamy, M. Schwam and S. Behnke, "Robust 6D Object Pose Estimation in Cluttered Scenes Using Semantic Segmentation and Pose Regression Networks," 2018 IEEE/RSJ International Conference on Intelligent Robots and Systems (IROS), Madrid, Spain, 2018, pp. 6660-6666.

K. Lai, L. Bo, X. Ren, and D. Fox, "A large-scale hierarchical multiview rgb-d object dataset," in IEEE International Conference on Robotics and Automation (ICRA), Shanghai, China, 2011, pp. 1817-1824.

P. Marion, P. R. Florence, L. Manuelli, and R. Tedrake, "LabelFusion: A pipeline for generating ground truth labels for real RGBD data of cluttered scenes," arXivpreprint arXiv:1707.04796, 2017.

S. Sengupta, V. Jayaram, B. Curless, S. Seitz, and I. K. Shlizerman, "Background Matting: The World is Your Green Screen", arXiv preprint arXiv: 2004.00626, 2020.

B. Bovcon, J. Muhovic, J. Pers and M. Kristan, "The MaSTr1325 dataset for training deep USV obstacle detection models," 2019 IEEE/RSJ International Conference on Intelligent Robots and Systems (IROS), Macau, China, 2019, pp. 3431-3438.

A. Radford, L. Metz, and S. Chintala, "Unsupervised Representation Learning with Deep Convolutional Generative Adversarial Networks," arXiv preprint arXiv.T511.06434, Jan. 2016, 16 pages.

M. Arjovsky, S. Chintala, and L. Bottou, "Wasserstein GAN," arXiv preprint ar.Y / v: 1701.07875, Dec. 2017, 32 pages.

J. J. Lim, A. Khosla, and A. Torralba, "Fpm: Fine pose parts-based model with 3d cad models," in European Conference on Computer Vision (ECCV), Springer, 2014, pp. 478-493.

G. Pavlakos, X. Zhou, A. Chan, K. G. Derpanis, and K. Daniilidis, "6-dof object pose from semantic keypoints," in IEEE International Conference on Robotics and Automation (ICRA), Singapore, 2017, pp. 2011-2018.

Y. Xiang, T. Schmidt, V. Narayanan, and D. Fox, "Posecnn: A convolutional neural network for 6d object pose estimation in cluttered scenes," arXivprepFrint arXivAl11.00199, 2017.

J. Wu et al., "Real-Time Object Pose Estimation with Pose Interpreter Networks," 2018 IEEE/RSJ International Conference on Intelligent Robots and Systems (IROS), Madrid, Spain, 2018, pp. 6798-6805.

H. Wang, S. Sridhar, J. Huang, J. Valentin, S. Song and L. J. Guibas, "Normalized Object Coordinate Space for Category-Level 6D Object Pose and Size Estimation," 2019 IEEE/CVF Conference on Computer Vision and Pattern Recognition (CVPR), Long Beach, CA, USA, 2019, pp. 2637-2646.

S. Gu, A. Lugmayr, M. Danelljan, M. Fritsche, J. Lamour and R. Timofte, "DIV8K: Diverse 8K Resolution Image Dataset," 2019 IEEE/CVF International Conference on Computer Vision Workshop (ICCVW), Seoul, Korea (South), 2019, pp. 3512-3516.

M. Shugrina et al., "Creative Flow+ Dataset," 2019 IEEE/CVF Conference on Computer Vision and Pattern Recognition (CVPR), Long Beach, CA, USA, 2019, pp. 5379-5388.

(56) References Cited

OTHER PUBLICATIONS

M. Cordts et al., "The Cityscapes Dataset for Semantic Urban Scene Understanding," 2016 IEEE Conference on Computer Vision and Pattern Recognition (CVPR), Las Vegas, NV, USA, 2016, pp. 3213-3223.

S. R. Richter, V. Vineet, S. Roth, V. Koltun. "Playing for data: ground truth from computer games," In European conference on computer vision (ECCV), 2016.

A. Bochkovskiy, C. Wang, H. M. Liao, "YOLOv4: Optimal Speed and Accuracy of Object Detection," arXiv preprint arXiv:2004.10934, 2020.

* cited by examiner

ROBOTIC MEAL-ASSEMBLY SYSTEMS AND ROBOTIC METHODS FOR REAL-TIME OBJECT POSE ESTIMATION OF HIGH-RESEMBLANCE RANDOM FOOD ITEMS

CROSS-REFERENCE TO RELATED APPLICATIONS

This application is the National Stage Application of International Patent Application No. PCT/SG2022/050312, filed May 12, 2022, which claims priority from Singapore Patent Application Ser. No. 10202105020X filed on 12 May 2022 and 10202105019T filed on 12 May 2022.

TECHNICAL FIELD

The present invention generally relates to robotic assembly systems, and more particularly relates to robotic meal-assembly systems and robotic methods for real-time object pose estimation of high-resemblance random food items with automated visual inspection and item arrangement verification.

BACKGROUND OF THE DISCLOSURE

The COVID-19 pandemic has had a detrimental effect on the global economy and health. Such a seriously transmittable disease has raised public awareness of disease propagation. Typically, food and food serving are one of the most significant disease spreading ways since the human touch in food handling is inevitable. For this reason, replacing human handling of food during preparation by automatic systems can greatly reduce the probability of viral transmission. In recent years, the application of food analysis is significantly growing, while these technologies are mainly focusing on recipe understanding and ingredient recognition in cooked dishes. In a robot-cooperative system, however, the spatial information of the objects should be taken into account rather than just providing category recognition. As such, food ingredient recognition systems that include pose estimation in six degrees of freedom (6D pose estimation), play key roles in an automatic kitchen system to permit quick identification and localization of food items for processing.

The last few years have witnessed fast development in object 6D pose estimation through image manipulation techniques and Convolutional Neural Network (CNN)-based methods. The most traditional methods use pattern matching by computer automated display (CAD) models. These approaches consider local descriptors such as scale-invariant feature transform (SIFT) and alignment methods like iterative closest point (ICP) to estimate the pose of angular or richly-textured items. However, these methods also require the use of CAD models of the objects, which is a challenge in the food industry as food items have high resemblance yet differ from each other especially for food ingredients. Furthermore, pattern matching technologies are texture-dependent and may not be suitable for piles of similar objects. Thus, these approaches are specific to their application scenarios and may not be appropriate for a diversified field unless known models are available.

Apart from techniques that are model-based, CNN-based methods have developed significantly in the accuracy of object detection and 6D pose estimation. However, the indispensable precondition for CNNs is a huge dataset with annotation for the 6D pose of the interested objects. The 6D pose annotation is labor-consuming even when adopting automatic annotating methods such as synthetic methods or three-dimensional (3D) scene reconstruction, and it is difficult to define such a complex ground-truth for a pile of objects of high resemblance.

However, it remains important to achieve high throughput and yield in the assembly of components for products in a high-speed automated manufacturing scenario. Technology regarding such scenarios is considered mature in industries such as electronic product manufacturing. This is because for every product, the characteristics of the components involved, like dimension and weight, are known to a high precision prior to assembly. The components for that product are also presented to manipulators in defined orientations and precise locations via highly customized assembly lines so that pick-and-place actions can be done rapidly and reliably.

The automated assembly of meals, however, is more challenging. Specifically, the use of a single automation setup to perform high-speed assembly of a variety of meals presents challenges that are hard to solve. This pain point is especially felt by commercial kitchens that manufacture fresh in-flight meals for various airlines as they are required to quickly prepare significant quantities of one meal type before switching to another and then repeating. Presently, such commercial kitchens rely primarily on human labour because it is difficult to design automation that can satisfy the high-speed and high-mix nature of the meal-production process. Most of such workers, however, are elderly as the menial tasks, lower wages and absence of career prospects associated with this role are not appealing to younger workers.

Therefore, an effort has been embarked upon to design automation capabilities needed to address high-speed and high-mix meal production requirements. The developed automation typically uses a high-speed robot arm with a gripper that can move food items from an input conveyor to meal trays. The result is a versatile system for assembling a variety of meals because it is possible for the gripper to pick various types of items. However, it is challenging to pick each type of food item with a success rate that is close to 100% because food items can differ in shape, weight, and size even within the same food type and food items are presented to the gripper in unpredictable poses as each type of food is piled within large trays before portioning into meals.

As a result of these challenges, it has been noted that instances of attempting to pick individual food items via a mechanical gripper can fail. The gripper may miss the targeted piece of food during picking or the item may fall from the gripper enroute to being placed in the meal tray.

While improvements have been developed to enhance gripping reliability, computer vision is also needed to perform error checking on the meals assembled by the robot so that imperfectly assembled meals can be flagged and remedy actions by the robot or a human operator can be performed. Computer-vision automation in food meal preparation also has its challenges. Such computer-vision solutions must determine whether each meal at the system's output has all its component food items to ensure that each meal is complete and uniform with other meals. In addition, the computer-vision solutions must verify that each food item has been located correctly in relation with other food items in the output meal tray so that the meal is adequately presented visually.

Thus, there is a need for robotic systems and robotic methods for automated assembly of meals which address the challenges of real-time object pose estimation of high-resemblance random food items with automated visual inspection and item arrangement verification presented by automated meal assembly systems and methods and other food and meal preparation systems and methods. Furthermore, other desirable features and characteristics will become apparent from the subsequent detailed description and the appended claims, taken in conjunction with the accompanying drawings and this background of the disclosure.

SUMMARY

According to at least one aspect of the present embodiments, a system for automatic kitting of items is provided. The system includes a robotic device, a first imaging device, a computing device and a controller. The robotic device includes an arm with a robotic gripper at one end. The first imaging device is focused on a device conveying kitted items. The computing device is coupled to the first imaging device and is configured to process image data from the first imaging device. The computing device includes item arrangement verification software configured to determine whether each item desired to be in the kitted items is present or absent in the kitted items in response to the processed image data from the first imaging device and generates data based on whether an item desired to be in the kitted items is absent from the kitted items. The controller is coupled to the computing device to receive the data from the computer representing whether an item desired to be in the kitted items is absent from the kitted items. The controller is also coupled to the robotic device for providing instructions to the robotic device to control movement of the arm and the robotic gripper, wherein at least some of the instructions provided to the robotic device are generated in response to the item desired to be in the kitted items being absent from the kitted items.

According to another aspect of the present embodiments, a robotic method is provided for automatic kitting of items. The method includes imaging kitted items to generate first image data and determining whether each item desired to be in the kitted items is present or absent in the kitted items in response to the first image data. The method also includes generating data based on whether an item desired to be in the kitted items is absent from the kitted items and generating robotic control instructions in response to the item desired to be in the kitted items being absent from the kitted items. Finally, the method includes providing the robotic control instructions to a robotic device to control movement of an arm and a robotic gripper of the robotic device, wherein the robotic control instructions comprise one or more instructions to pick an item corresponding to the item desired to be in the kitted items which is absent from the kitted items and place the picked item into the kitted items.

According to yet a further aspect of the present embodiments, a computer readable medium for automatic kitting of items in a robotic system is provided. The computer readable medium includes instructions to cause a controller in the robotic system to image kitted items to generate first image data and to determine whether each item desired to be in the kitted items is present or absent in the kitted items in response to the first image data. The computer readable medium also includes instructions to cause the controller to generate data based on whether an item desired to be in the kitted items is absent from the kitted items and to generate robotic control instructions in response to the item desired to be in the kitted items being absent from the kitted items. Finally, the computer readable medium includes instructions to cause the controller to provide the robotic control instructions to a robotic device to control movement of an arm and a robotic gripper of the robotic device, wherein the robotic control instructions comprise one or more instructions to pick an item corresponding to the item desired to be in the kitted items which is absent from the kitted items and place the picked item into the kitted items.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with present embodiments.

FIG. 1, comprising FIGS. 1A and 1B, depicts photographs of foods for meal assembly in accordance with present embodiments, wherein FIG. 1A depicts foods piled in trays for assembly into meals and FIG. 1B depicts various foods from the trays in FIG. 1A assembled in a meal tray.

FIG. 9, comprising FIGS. 9A to 9D, depicts images defining and evaluating regions by the IAV algorithm in accordance with the present embodiments, wherein FIG. 9A depicts defined regions within a meal tray, FIG. 9B depicts an example of boundaries of the regions, FIG. 9C depicts a food item placed in the meal tray, and FIG. 9D depicts an original bounding box and a small bounding box as determined by the IAV algorithm.

FIG. 10, comprising FIGS. 10A, 10B and 10C, depicts images of states of the output tray as evaluated by the IAV algorithm in accordance with the present embodiments, wherein FIG. 10A depicts a pass state, FIG. 10B depicts an absent state, and FIG. 10C depicts a shifted state.

FIG. 14, comprising FIGS. 14A, 14B and 14C, depicts manipulated and transformed items rotated and color converted in accordance with the present embodiments, wherein FIG. 14A depicts rotated items where the images are annotated with the degree of rotation, FIG. 14B depicts rotated items rotated at 90, 180 and 270 degrees, and FIG. 14C depicts color conversion of the items.

Skilled artisans will appreciate that elements in the figures are illustrated for simplicity and clarity and have not necessarily been depicted to scale.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of present embodiments to present methods and systems for Fast Image to Pose Detection (FI2PD) method for item recognition and 6D pose detection, especially for objects with high assemblance such as foods and fruits. The systems and methods in accordance with the present embodiments are convolutional neural network (CNN) based and can construct the 6D pose of the items from RGB images directly without 3D models or semantic information for training. A prior knowledge, such as a range of orientation (ROO), is added in the annotation to predict the rough direction, and will be applied to fast calculate the 6D pose of the objects. Accordingly, the methods and systems in accordance with the present embodiments includes a novel 6D pose estimation strategy for high-resemblance random objects which achieves 6D pose estimation from RGB images with the prior knowledge of ROO and a food ingredient dataset for 6D object pose estimation, where food items with high-resemblance shapes are piled together and annotations with ROO for five types of food items are provided.

In accordance with the present embodiments, a system has been developed for manufacturing fresh meals using automation. The system has an input conveyor belt where the food items that constitute the meal are presented in trays. The system also has an output conveyor belt where multiple casserole meal-trays are assembled. A robot arm repeatedly moves the desired amount of component food items from the input side and deposits them at each meal tray on the output side, thus assembling a meal in every tray in accordance with a predetermined routine.

Computer-aided visual analysis occurs at the input side to ensure that the correct food items are picked. In accordance with the methods and systems of the present embodiments, this analysis at the input side also provides the location of the food item targeted for picking so that the robot arm can move the robotic gripper to that location.

At the output side, computer-aided visual analysis is also performed to verify that each meal tray has been filled with the correct types and amounts of component food items. To ensure consistency in visual presentation, the analysis at the output side in accordance with the present embodiments also checks to determine whether each food item has been placed within a predefined region of the meal tray.

Figure 1A:
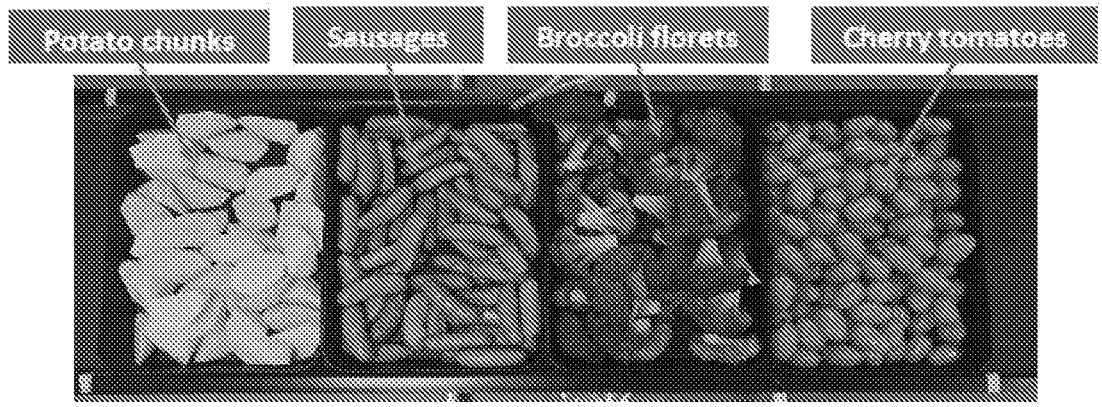
Figure 1B:
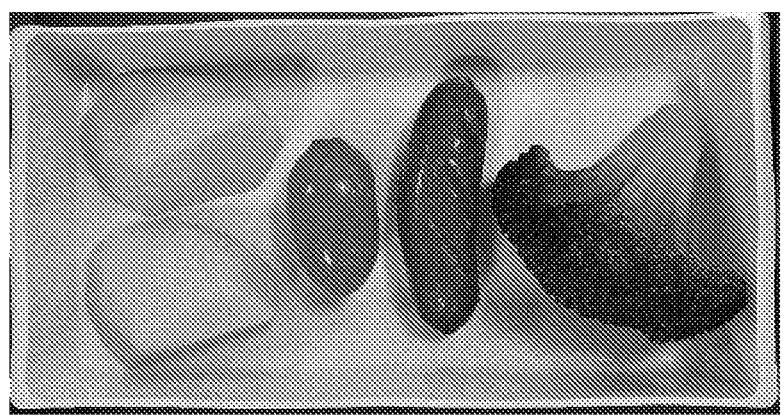

Referring to FIG. 1A, a photograph 100 depicts foods piled in trays at the input side awaiting picking by the robot arm for assembly into meals. From left to right, the food items include potato chunks, sausages, broccoli florets and cherry tomatoes as examples of some of the foods that can constitute an in-flight meal. A sample in-flight meal similar to that from a western menu is shown in a photograph 150 in FIG. 1B. Each meal consists of the following component food items: one piece of broccoli, one sausage, one cherry tomato and two pieces of potatoes. The photograph 150 also serves as an example of an ideal placement of these food items in relationship each other.

In accordance with the methods and systems of the present embodiments, an item-arrangement verifier (IAV) algorithm has been developed as part of the overall meal assembly system to automatically perform a visual inspection of each meal at the output. The IAV is a software component in the high-speed meal assembly system, and the system also includes two main physical components: a robot work cell and a computer running the IAV algorithm.

Figure 2:
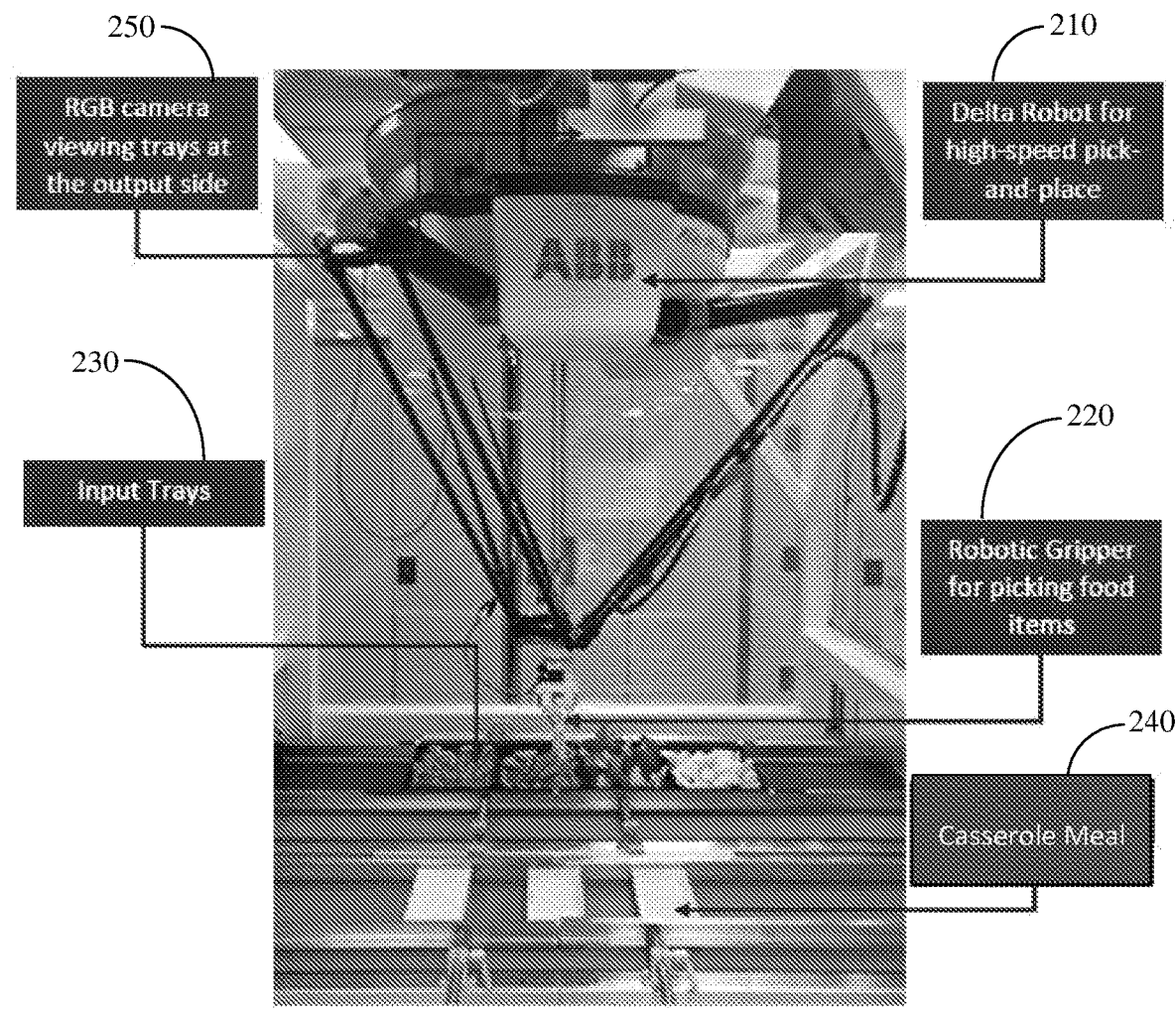
FIG. 2 depicts a photograph of a robot work cell for a high-speed meal assembly system in accordance with the present embodiments.

Referring to FIG. 2, a photograph 200 depicts a robot work cell in a front planar view in accordance with the present embodiments. The robot work cell houses a delta robot 210 that has a gripper 220 as an end effector for picking individual food items. The work cell comprises two halves, with a conveyor belt at each side. At the input half, individual input trays 230 each containing a single type of food item such as seen in FIG. 1A are present. The input trays 230 hold the component food items that will be used to assemble a meal. At the output half, there are empty output meal trays 240. A meal can thus to be assembled within each meal tray. An RGB camera 250 is focused on the output half to view the output trays 240 for inspection as hereinafter described.

Figure 3:
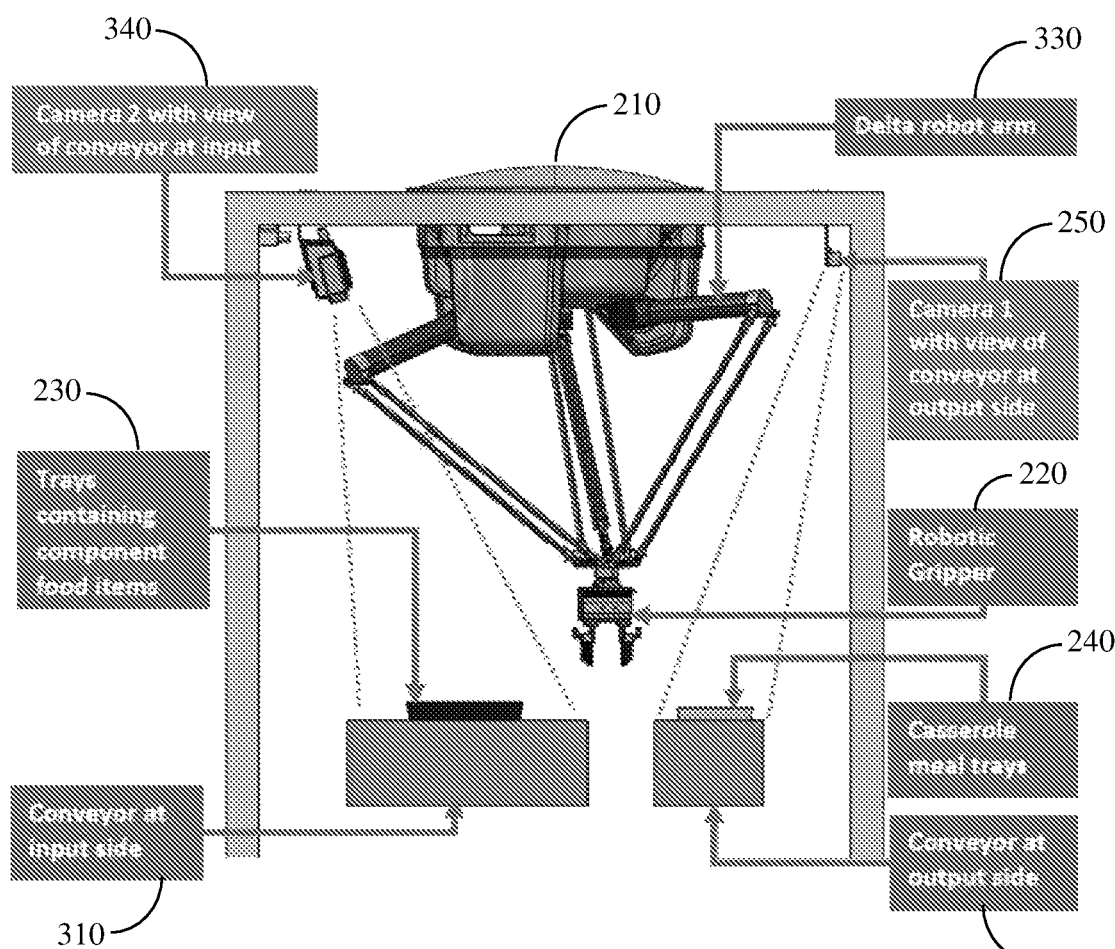
FIG. 3 depicts a schematic illustration of the layout of the high-speed meal-assembly system in accordance with the present embodiment.

Referring to FIG. 3, a schematic illustration 300 depicts the work cell of the automated robotic kitchen in accordance with the present embodiments in a planar side view. The illustration 300 shows a conveyor 310 at the input side for carrying the input trays 230 into and out of the work cell and a conveyor 320 at the output side for carrying the empty output trays 240 into the work cell and the full output trays 240 out of the work cell. The robotic gripper 220 at the end of a robotic arm 330 of the delta robot 210 picks food items from the input trays 230 and places them into the output trays 240 for automated food assembly within an automated robotic kitchen. The rise in the number of automated robotic kitchens for food assembly leads considerable requirements on food analysis including ingredient classification and pose recognition. The computer vision to enable such automated food assembly is handled by an input camera 340 for viewing input food items and the input trays 230 on the input conveyor 310 and the output camera 250 viewing the completed food trays 240 on the output conveyor 320.

Determining the most pickable piece from a pile of similarly shaped food items is essential to automated meal assemblies facilitated by computer vision and robotic grippers. Hence, a novel approach for food pose detection based on a convolutional neural network (CNN) and pose retrieval model in accordance with the present embodiments is provided. This approach is termed Fast Image to Pose Detection (FI2PD) through which the 6D pose of the items can be constructed from only RGB images from the input camera 340 or the output camera 250. Furthermore, a FdIngred328 dataset of five food categories ranging from fake foods to real foods and the automatic generated data based on basic manipulation and synthetic techniques is introduced in accordance with the present embodiments. Prior knowledge of range of orientation (ROO) is considered in this pose retrieval process to derive the direction and enhance the real-time capability. As demonstrated hereinafter, the method in accordance with the present embodiments has a good performance for object recognition and pose detection using the FdIngred328 dataset, achieving 97.9% success rate and 858.9 ms per image when applied within a robotic food handling system.

Figure 4:
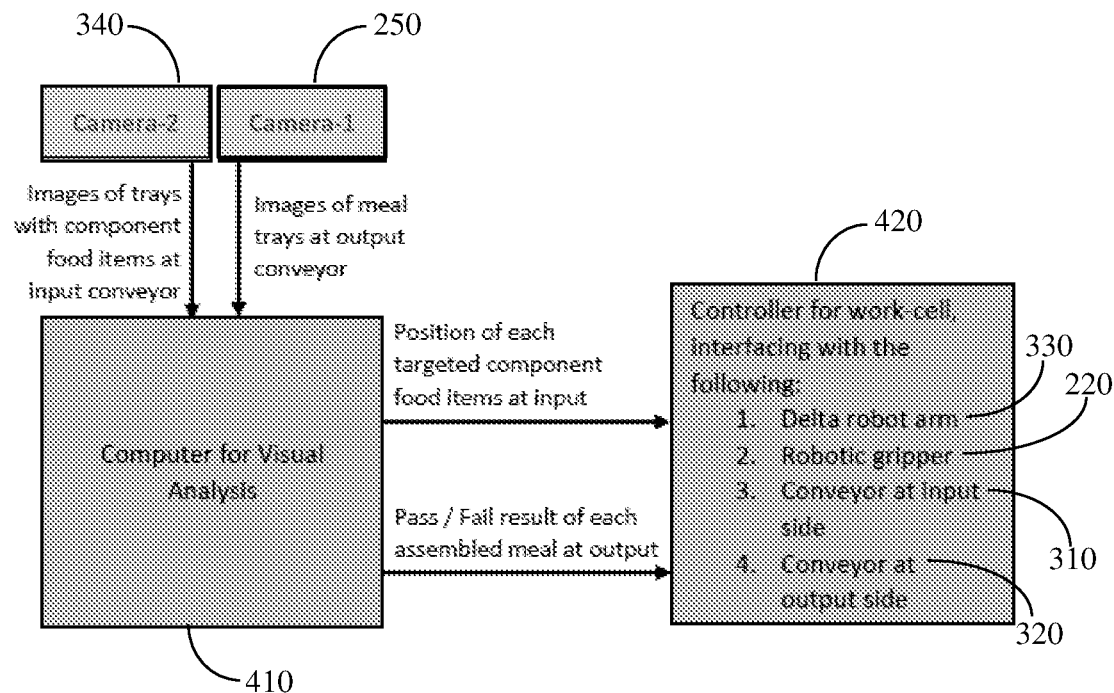
FIG. 4 depicts a block diagram of the systems components and data flow of the high-speed meal-assembly system in accordance with the present embodiment.

Referring to FIG. 4, a block diagram 400 depicts the systems components and data flow of the high-speed meal-assembly system in accordance with the present embodiment. The cameras 340, 250 provide visual data to a computer 410 for visual analysis, where the input camera 340 provides images of the input trays 230 having component food items at the input conveyor 310 and the output camera 250 provides images of the output meal trays 240 at the output conveyor 320. The computer 410 is connected to a controller 420 for the work cell which interfaces with the robot arm 330, the robotic gripper 220, the input conveyor 310, and the output conveyor 320. The computer 410 provides to the controller 420 the position of each targeted component food item at the input side for the robot arm 330 to locate and the robotic gripper 220 to grip. In addition, the computer 410 provides to the controller 420 a pass/fail result of each assembled meal tray 240 at the output side.

Figure 5:
FIG. 5 depicts an image of an input tray from a Red Green Blue Depth (RGBD) sensor for use as an input ray image in accordance with the present embodiments.

The camera 340 at the input side is a Red Green Blue Depth (RGBD) sensor. Therefore, its output is a point-cloud image that contains a standard array of image pixels as well as a distance (or depth) of each pixel from the camera 340. An example of an image 500 provided by the camera 340 is shown in FIG. 5. The computer receives the RGBD image as input so that the vision-analysis algorithm that processes the scene from the input conveyor 310 can determine a three-dimensional (3D) position of each food item in view. The camera 250 is a standard RGB sensor that provides a two-dimensional (2D) array of image pixels to the computer.

Figure 6:
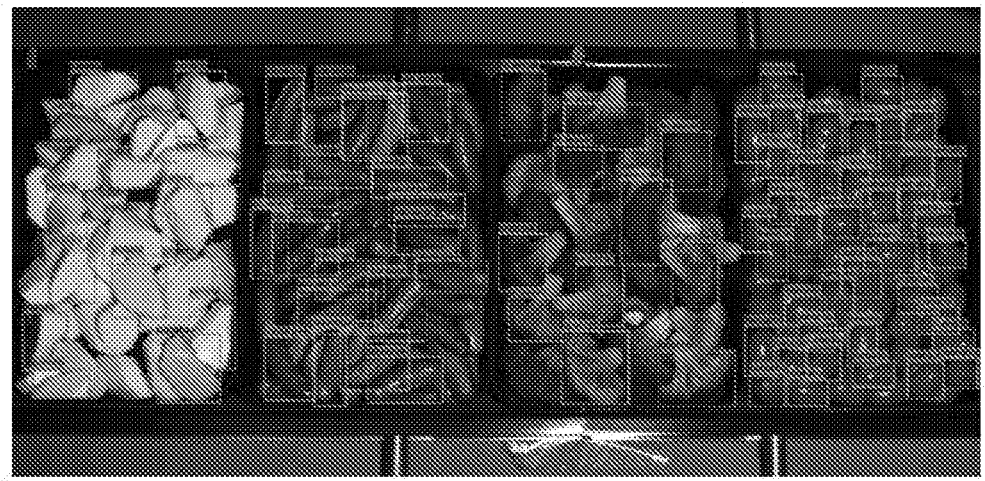
FIG. 6 depicts an image of an input tray from an input camera showing object recognition in accordance with the present embodiments.

The computer 410 is used for visual analysis in accordance with the present embodiments. The role of the computer 410 is two-fold. First, the computer 410 recommends a piece of food to pick from each tray at the input conveyor, as well as the 3D coordinates and pose of that piece. To do this, the type of food being presented at each tray must be recognised by the computer 410. This is achieved via an object-recognition capability that has been trained offline via machine learning. FIG. 6 depicts an image 600 showing object recognition in accordance with the present embodiments differentiating between different types of food but also recognising multiple pieces of the same food types. The recommended piece of food to be picked from each compartment of the input tray 230 is usually the highest-most piece in the pile of food items in that compartment. The coordinates of that piece and its pose (or orientation) in 3D space will later be used by the controller to ascertain the optimal destination and orientation for the gripper.

The second objective of the computer 410 occurs after the robot arm 330 has transferred desired food items from the input conveyor 310 to the meal trays 240 at the output conveyor 320. In accordance with this second objective, each meal tray 240 at the output conveyor 320 is checked to determine if all component food items can be seen in each meal tray. If this condition is true, then the computer 410 ascribes a "Pass" state to that meal. Otherwise, the meal is given a "Fail" state by the computer 410.

This Pass/Fail status is formatted for communication to the work-cell controller 420 in the form of a Boolean array. Each cell in this array corresponds to one of the component food items in the formulated meal tray 240. A meal that has passed verification has a true state in each cell of this Boolean array. The array belonging to a meal that has failed the verification has one or more cells with a false state.

The controller 420 receives data from the computer 410 and sends instructions to four components within the work-cell: the delta robot arm 330, the robotic gripper 220 and both conveyor belts 310, 320. These instructions to activate the above-mentioned components are coordinated by a Motion-Planning Routine (MPR) residing within programming of the controller 420. The MPR runs in a loop once the main program in the controller 420 has begun. The flowchart 700 of FIG. 7 explains a Motion-Planning Routine in accordance with the present embodiments. The process begins when an empty meal tray 240 is fed into 702 the output conveyor 320. This event is detected by an optical sensor on the conveyor 320 and triggers the MPR to execute. Consequently, the MPR is able to track a position of the meal tray 240 on the conveyor 320.

The MPR then instructs 704 the robot arm 330 to move and pick the first food item recommended by the computer 410. The arm 330 then moves to place (or deposit) this piece of food at the meal tray 240. This pick-and-place motion is repeated for each of the remaining food items for the meal tray. At every iteration of this motion, the robotic gripper 220 is instructed to grasp at the correct moment when picking and to release at the corresponding moment when placing.

After executing all pick-and-place motions 704 for that meal, the MPR refers 706 to the input of the computer 410 regarding that meal's "Pass/Fail" status. On receiving the Boolean array that indicates a pass 706, the meal is moved downstream 708 by the output conveyor 320 for further processing, such as packaging, and processing returns 710 to assemble a next meal tray 240.

If a meal fails this verification 706, a remedying action 712 is necessary. The MPR will instruct the robot arm 330 to perform one pick-and-place motion for the food item that corresponds to each array cell with a false state. A second verification 714 of the meal tray 240 is performed visually by the computer 410. If the meal tray 240 passes the verification 714, it is sent downstream 708 as per normal. If the meal tray 240 fails, it is still sent downstream 716. However, the computer 410 flags the meal tray 240 as requiring human intervention 716 and processing returns 710 to start the next meal tray.

Figure 8:
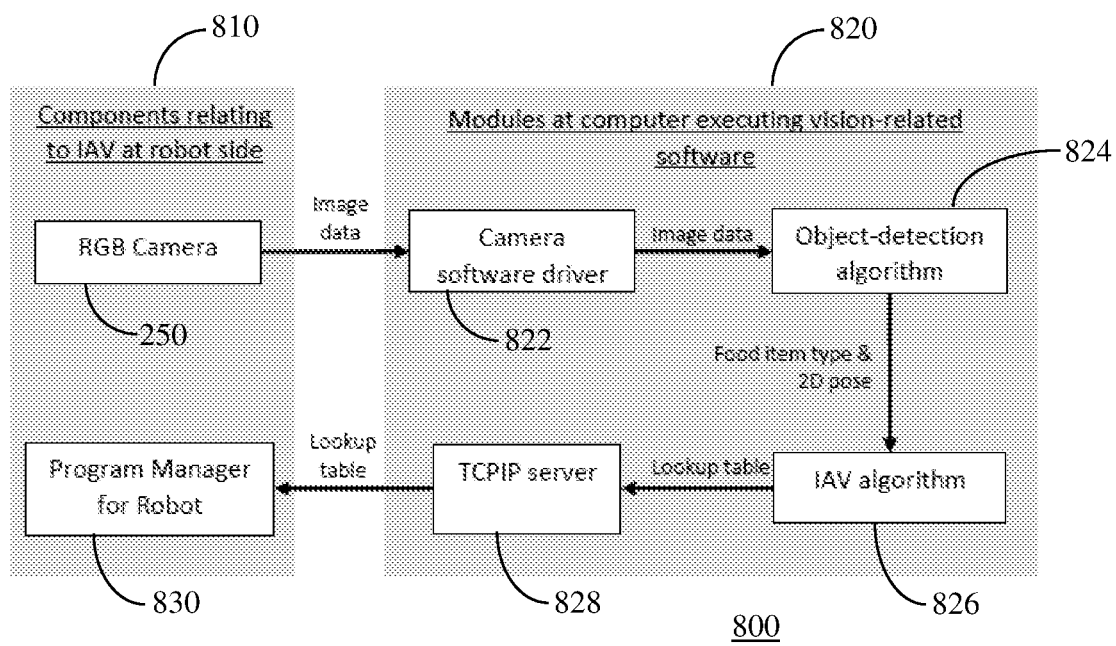
FIG. 8 depicts a schematic illustration of an item-arrangement verifier (IAV) algorithm in accordance with the present embodiments.

In accordance with the methods and systems of the present embodiments, an item-arrangement verifier (IAV) algorithm resides within the computer 410 that communicates with the robot's controller 420 via a TCP/IP protocol. The RGB camera 250 that is viewing the output side of the work cell supplies the computer 410 with image data. As shown in the schematic illustration 300, the camera 250 is installed above the output conveyor 320. A schematic illustration 800 of the IAV-related system components is shown in FIG. 8. The IAV-related system includes components 810 at the robotic work-cell side such as the output RGB camera 250 and the robot program manager 830 of the controller 420. The IAV-related system also includes modules 820 at the computer 410 which execute vision-related software. A camera software driver 822 receives raw image data form the camera 250. The processed image data from the camera software driver 822 is provided to an object-detection algorithm 824. The object-detection algorithm 824 identifies the food item type and a 2D pose of the food item and passes this information to the IAV algorithm 826. The IAV algorithm 826 verifies the food type and pose and outputs a lookup table via a TCP/IP server 828 to the program manager 830 of the controller 420 for determining the Pass/Fail state of the output meal tray 240.

The object-detection algorithm 824 segments each of the placed food-items from the background scene and identifies the item. This identification ability is based on a computer-vision machine-learning exercise which has been conducted offline and prior to employing the overall system for meal assembly. Such a feature advantageously enables versatility for assembling different meal types in the methods and the systems in accordance with the present embodiments.

Figure 9A:
Figure 9B:
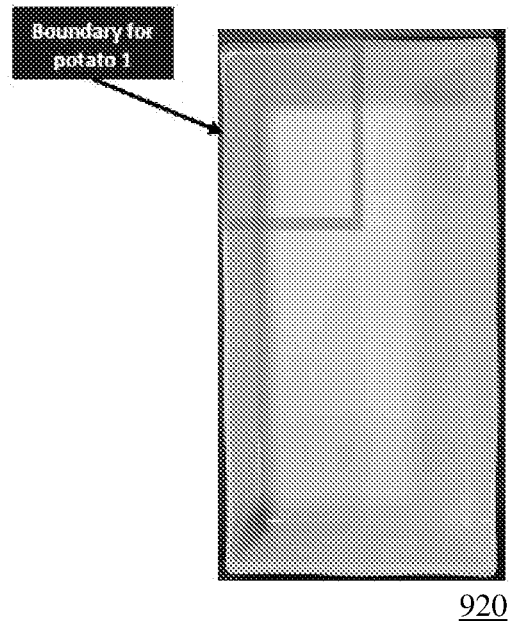

The object-detection algorithm 824 is also able to generate the 2D pose of the identified item. The type and 2D pose of each identified food item are supplied to the IAV algorithm 826 for evaluation. In accordance with the present embodiments, the IAV algorithm 826 includes an evaluation process which facilitates uniform and visually-appealing arrangement of food items within a meal during the high-speed meal-assembly routine. To aid this process, a region is predefined for each item within the tray's space. Each of these regions is depicted with grey boxes superimposed onto the image of an empty tray in the image 900 of FIG. 9A. Each box defining a region is termed as a "boundary" as shown in the image 920 of FIG. 9B.

Figure 9C:
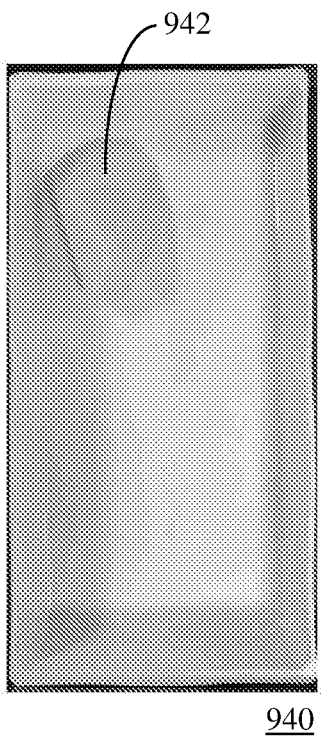
Figure 9D:
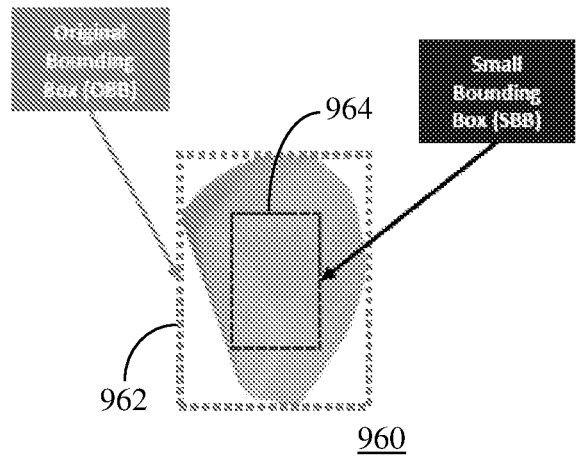

To determine that each food item of the correct type is present within its designated region on the meal tray, the IAV compares the pose of each food item with the coordinates of the corresponding boundary shown in the illustration 900. If the food item is found within its boundary, it is deemed correctly placed. However, since food items are often irregularly shaped, and also because the food can shift during the motion of placing, it is likely that some portion of the food will be found outside the boundary during the evaluation. For this reason, some flexibility has been inbuilt within the IAV's evaluation step so that the pass/fail criteria are not overly stringent resulting in an excessive number of meals considered as improperly assembled. This feature for flexibility is described in conjunction with placement of a piece of potato within the output meal tray 240. In the image 940 of FIG. 9C, the potato 942 is shown already placed at its region in the meal tray 240. Using the pose information supplied by the object-detection algorithm 824, the IAV 826 establishes a bounding box around this food item. This bounding box is known as the original bounding box (OBB) 962 as shown in the image 960 of FIG. 9D. The size of the OBB 962 is based on the coordinates of the extreme top, bottom, left and right pixels of the potato's image.

The next step is to resize the bounding box so that it is a fraction the size of the OBB. Here, the resized bounding box is termed a small bounding box (SBB) 964. The reduction in size from that of the OBB 962 to the SBB 964 is based on a Tolerance Factor (TF). The TF as shown in the illustration 960 is set at 0.5, which translates to a SBB 964 with dimensions at 50% that of the OBB 962. The SBB 964 shares the same midpoint as the OBB 962 so that the visual centroid of the food item remains unchanged.

To the IAV algorithm 828, the SBB 964 is an abstract representation of the food item's size. The verification aspect of the IAV algorithm 828 thus involves two conditions: a first condition that the correct food type is present within the boundary and a second condition that none of the lines of the SBB 964 intersect those of its given boundary.

Figures 10A, 10B, 10C:
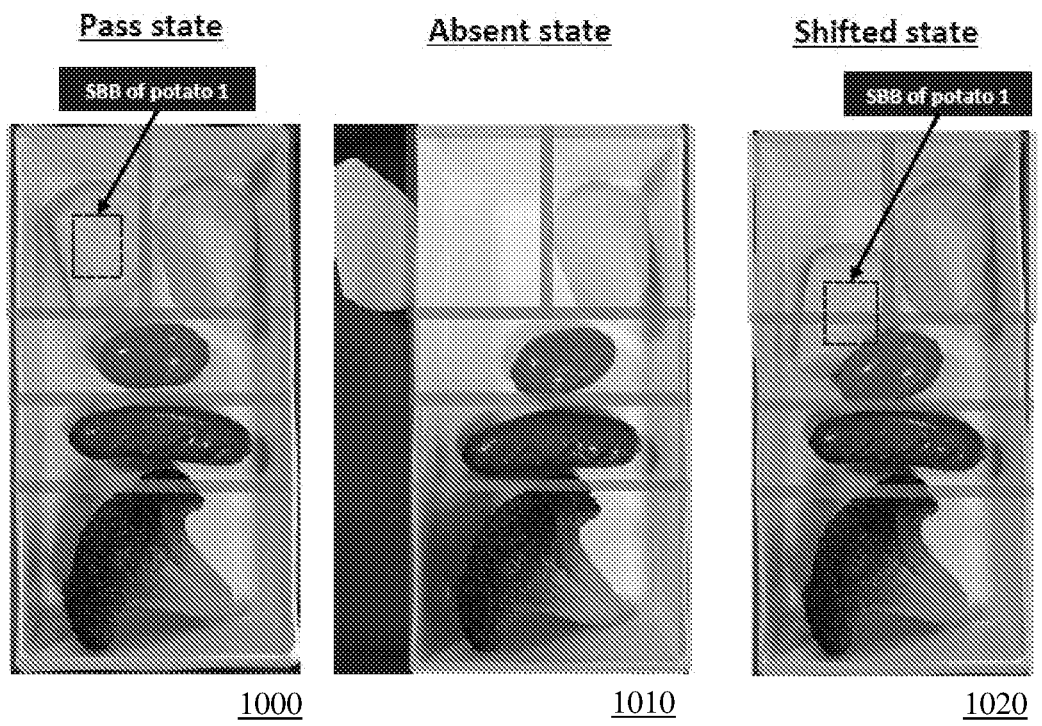

The rationale for the first condition is obvious. In terms of the second condition, an intersection of any of the SBB's lines with the boundary of that food item denotes that the food has landed too far away from the middle of its given region. In the example of the assembled meal shown in the image 1000 of FIG. 10A, both conditions are satisfied for the piece of potato at the top left corner of the meal tray. A "Pass" state is attributed to this piece of food. The same can be said for all the other food items within the image 1000. In the image 1010 of FIG. 10B, the piece of potato at the top left corner of the meal tray has landed outside the tray and the first condition has not been met. An "Absent" state is given to this situation. In the image 1020 of FIG. 10C, the first condition is satisfied but the second condition is not satisfied. As seen in the image 1020, the lines of the SBB for the piece of potato at the top left corner of the meal tray intersects with its boundary. In this case, the state of "Shifted" is allocated to that food item. Each of these three states determines a remedying action to be performed by the delta robot or by human intervention.

The IAV's output is a lookup table (LUT). This LUT has the same quantity of cells as the number of food items in each meal. In the example in the images 1000, 1010, 1020, the LUT has five cells. Each cell holds one of the three states: pass state, absent state, or shifted state. The LUT is received by the robot's programme manager of the controller 420 which directs the robot to react according to the state in each cell. As an example, in the case shown in the image 1020, the contents of the LUT would be as shown in TABLE 1:

TABLE 1

| Cell 1 | Cell 2 | Cell 3 | Cell 1 | Cell 1 |
| Potato 1 | Potato 2 | Cherry tomato | Sausage | Broccoli |
| --- | --- | --- | --- | --- |
| Shifted | Pass | Pass | Pass | Pass |

No action is taken if the indicated state is "Pass". On the other hand, if the state is "Absent", the robot arm is directed to pick a replacement piece of food corresponding to the cell. Should the state be indicated as "Shifted", the robot arm also does not perform any action. However, the meal tray 240 is flagged for post processing by a human operator as the meal tray 240 is moved downstream by the conveyor 320 and the operator will manually adjust the offending food item(s) on the flagged meal trays.

Figure 11:
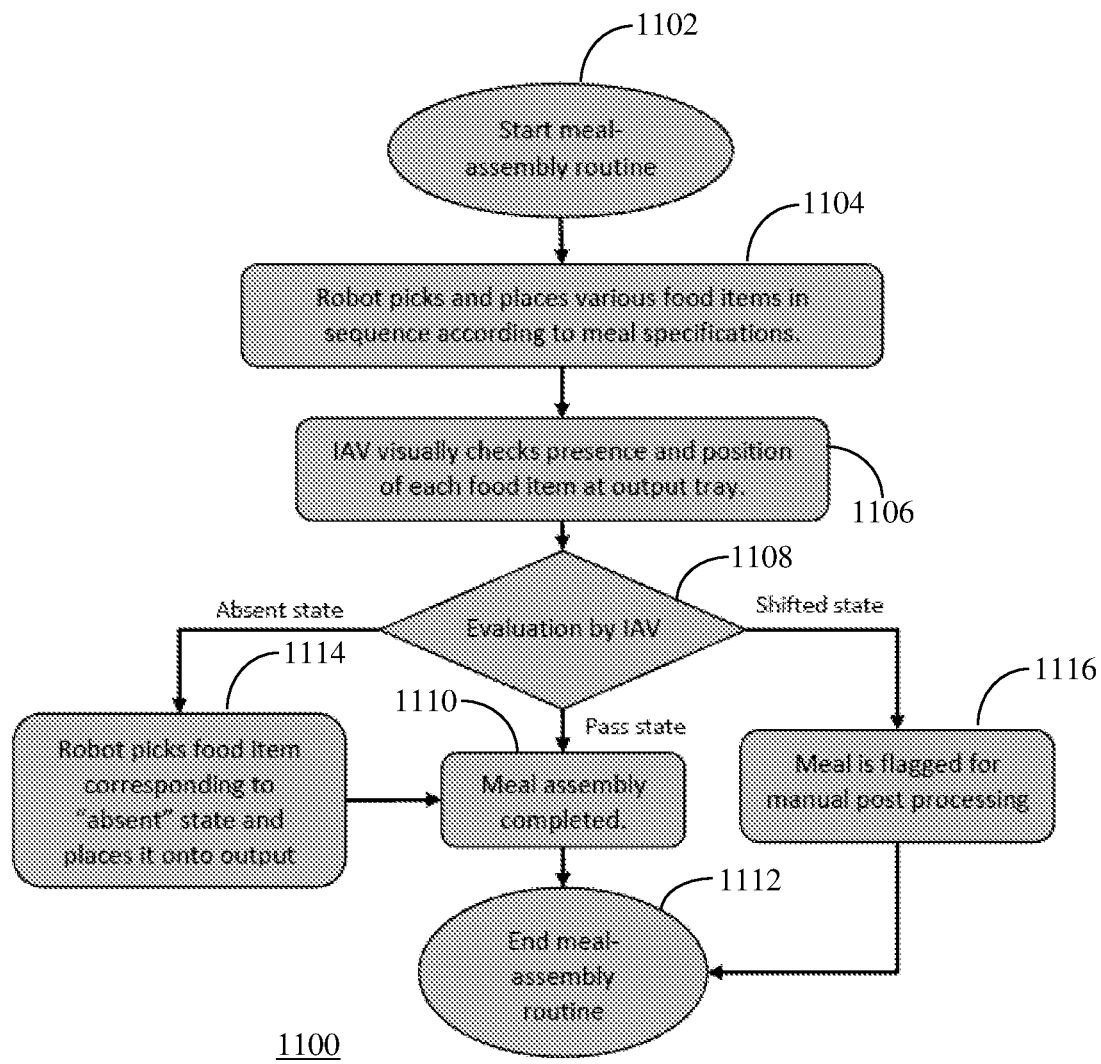
FIG. 11 depicts a flowchart of a meal assembly routine in accordance with the present embodiments.

The flow chart 1100 shown in FIG. 11 provides an explanation of the meal assembly routine and illustrates the role of the IAV within the process. The routine shown in the flowchart 1100 runs recursively within the programming of the robot's controller 420. Each iteration of this routine is for the assembly of one meal and the routine is executed when an empty meal tray is detected by the robot at the output conveyor belt.

The meal assembly routine starts 1102 by the robot picking and placing 1104 various food items in sequence according to specifications of the meal to be assembled. The IAV algorithm 828 reviews the food item type and pose information provided from the object-detection algorithm 826 (FIG. 8) to visually check 1106 the presence and the position of each food item in the output tray 240. If the evaluation 1108 by the IAV algorithm results in a "Pass" state, the meal assembly is completed 1110 and the meal assembly routine ends 1112 for that output tray 240. If the evaluation 1108 by the IAV algorithm results in an "Absent" state where a food item(s) is absent from the output tray 240, the robot picks 1114 a food item(s) corresponding to the "Absent" state and places it on the output tray 240. Then, the meal assembly is completed 1110 and the meal assembly routine ends 1112 for that output tray 240. Finally, if the evaluation 1108 by the IAV algorithm results in a "Shifted" state, the meal is flagged 1116 for manual post-processing and the meal assembly routine ends 1112 for that output tray 240.

Figure 7:
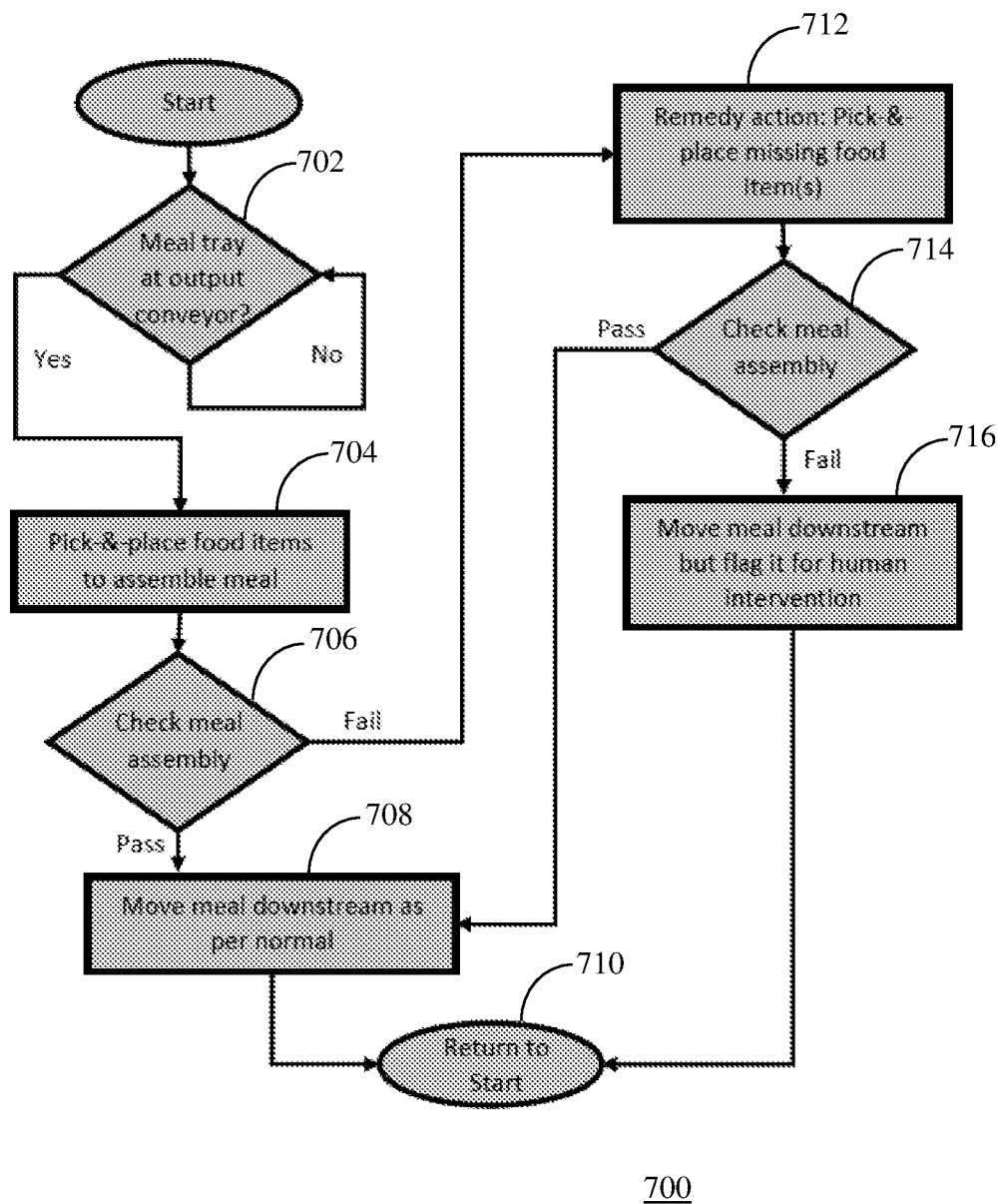
FIG. 7 depicts a flowchart of a Motion-Planning Routine (MPR) in accordance with the present embodiments.

As can be seen from FIGS. 7 and 11, meal assembly in accordance with the present embodiments utilize and manipulate visual image data captured by the cameras 340, 250 as datasets. Data augmentation techniques can increase the quantity of data in a dataset without collecting new data. Conventional methods adopt basic image processing technologies such as rotation, scaling, flipping and cropping to generate new samples, while other typical methods utilize a matting network to crop target objects from a background and combine them in different scenarios or use colour transfer protocol to address slight appearance differences of the images.

Recently, neural network-based data augmentation methods have been rapidly developed that can generate data automatically without manipulating the image nor the object properties. Such methods include Generative Adversarial Network (GAN) techniques and improved versions of GAN techniques. Deep Convolutional Generative Adversarial Network (DCGAN) is an unsupervised learning algorithm using CNN to build a generator and discriminator which has better performance on creating unique images. Furthermore, Wasserstein GAN (WGAN) is a modified version of DCGAN which eliminates the problem of training instability making it no longer necessary to pay attention to the balance of the discriminator and generator. Yet, the suitable original data for GAN-based methods is single image in which there may only be a single object or separate objects.

In terms of pose estimation, traditional methods used template matching with 3D models, and was mainly applied to highly textured objects to derive a 6D pose through local features such as scale-invariant feature transform (SIFT). In addition, for RGBD data, iterative closest point (ICP)-based algorithms are traditionally adopted for pose determination. Also, accurate pose estimation of objects in cluttered scenes can be calculated using PoseCNN which calculates a 3D translation through localizing a center of an object to estimate its distance from the camera and regressing the convolutional features to a quaternion representation. A two-stage method had been proposed that generates the Normalized Object Coordinate Space (NOCS) map via CNN and then aligns the NOCS map with a depth map to estimate the 6D pose and size of the objects.

In accordance with the methods and systems of the present embodiments, a two-stage strategy is proposed which acquires an object class, a bounding box, and range of orientation (ROO) from an RGB image via CNN at a first stage, and estimates a 6D pose through combination with depth information.

Figure 12:
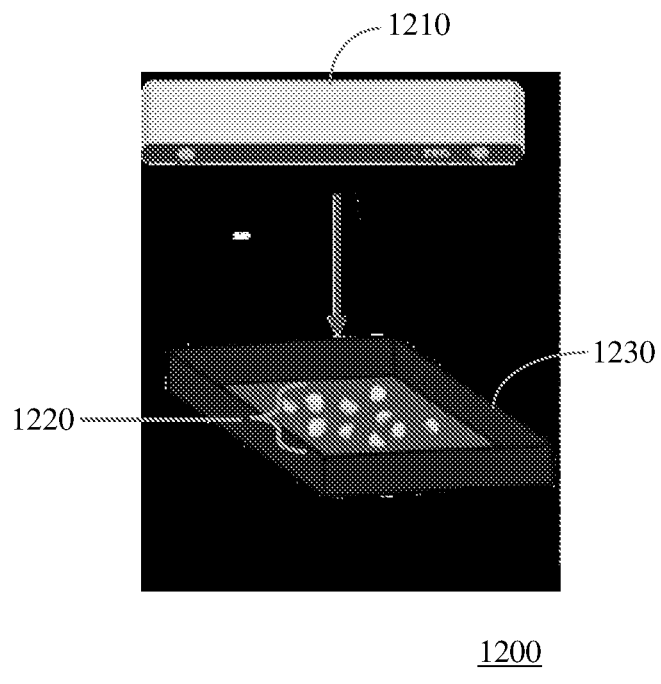
FIG. 12 depicts an illustration of a data acquisition setup for dataset generation of food items in accordance with the present embodiments.
Figure 13:
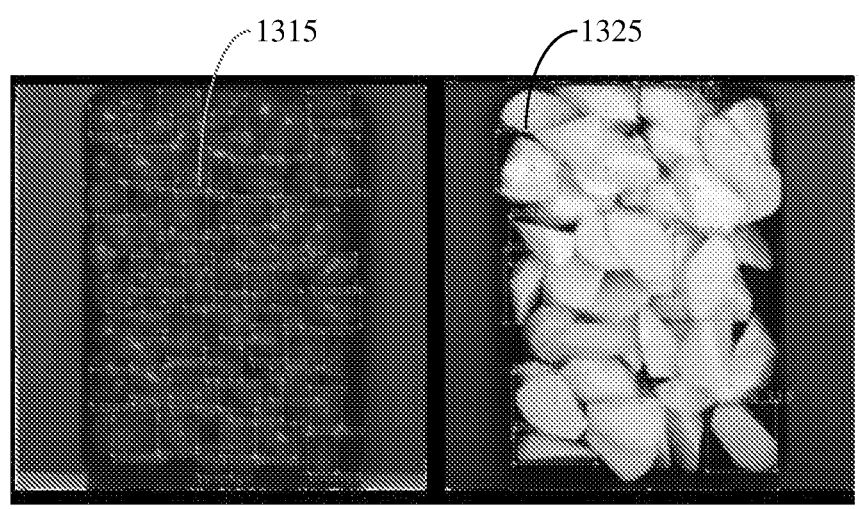
FIG. 13 depicts a top view image of collected food items with bounding box annotations in accordance with the present embodiments.

For better performance of object detection and pose estimation, multifarious datasets have been published. However, such datasets mainly concern different items which are always arranged separately or regularly. As such, a FdIngred328 dataset has been defined in accordance with the present embodiments to address high-resemblance random food items with different arrangements. To generate the FdIngred328 dataset, images of food items were collected through a RGBD sensor as shown in the illustration 1200 in FIG. 12 where a RGBD sensor 1210 (such as a ZED camera from Stereolabs Inc., San Francisco, USA) captures images of randomly arranged food items 1220 from a top view. Afterwards, the images are cropped to a suitable output size with the same resolution (328×328). The items were placed on a black tray 1230 and the images were acquired under natural illumination conditions. These images were annotated manually with bounding boxes 1315, 1325 of the items on the top layer as shown in the images 1310, 1320 of FIG. 13. The annotations have the form of bounding boxes 1315, 1325 and the annotations contain the class of the food item, a center of the bounding box, the size of the bounding box and, simultaneously, the range of the orientation (ROO) of the food item. While it is challenging for dataset setup as the data collection and the annotation are time-consuming and the food ingredients are difficult to prepare due to the wide and diverse varieties of food shapes, data augmentation techniques are adopted in accordance with the present embodiments to ensure robustness of the dataset.

Figure 14A:
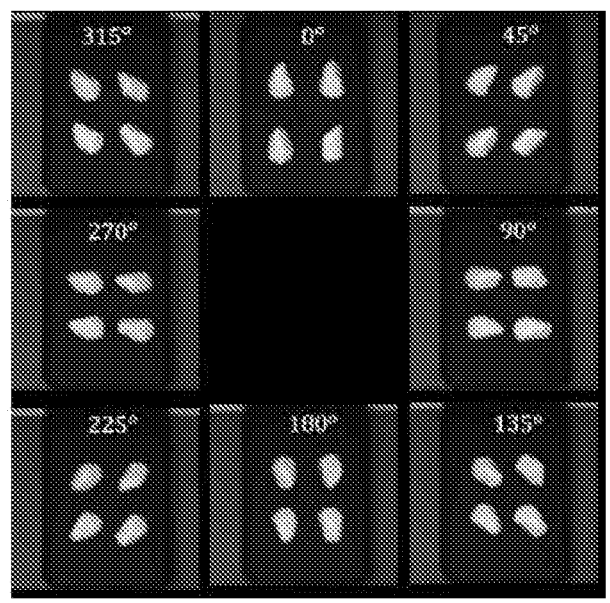
Figure 14B:
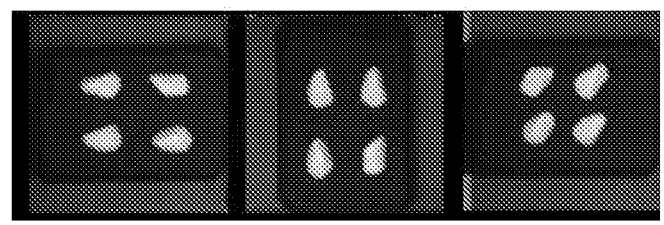
Figure 14C:
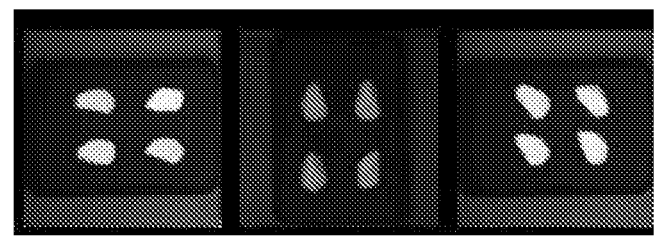

Samples of the arrangement of items and their manipulated images manipulated by data augmentation techniques that generate new data from the original dataset through manipulation and image transformation techniques in accordance with the present embodiments, such as rotation, image segmentation, color conversion, noise addition approaches, and combinations thereof, are shown in images 1400, 1430, 1460 of FIGS. 14A, 14B and 14C. The images 1400, 1430 depict images of the results of various rotations of the items where the image 1400 includes annotations indicating the various rotation angles while the image 1430 depicts the items rotated at 90, 180 and 270 degrees. The image 1460 depicts images of the results of various color conversion of the items.

Figure 15:
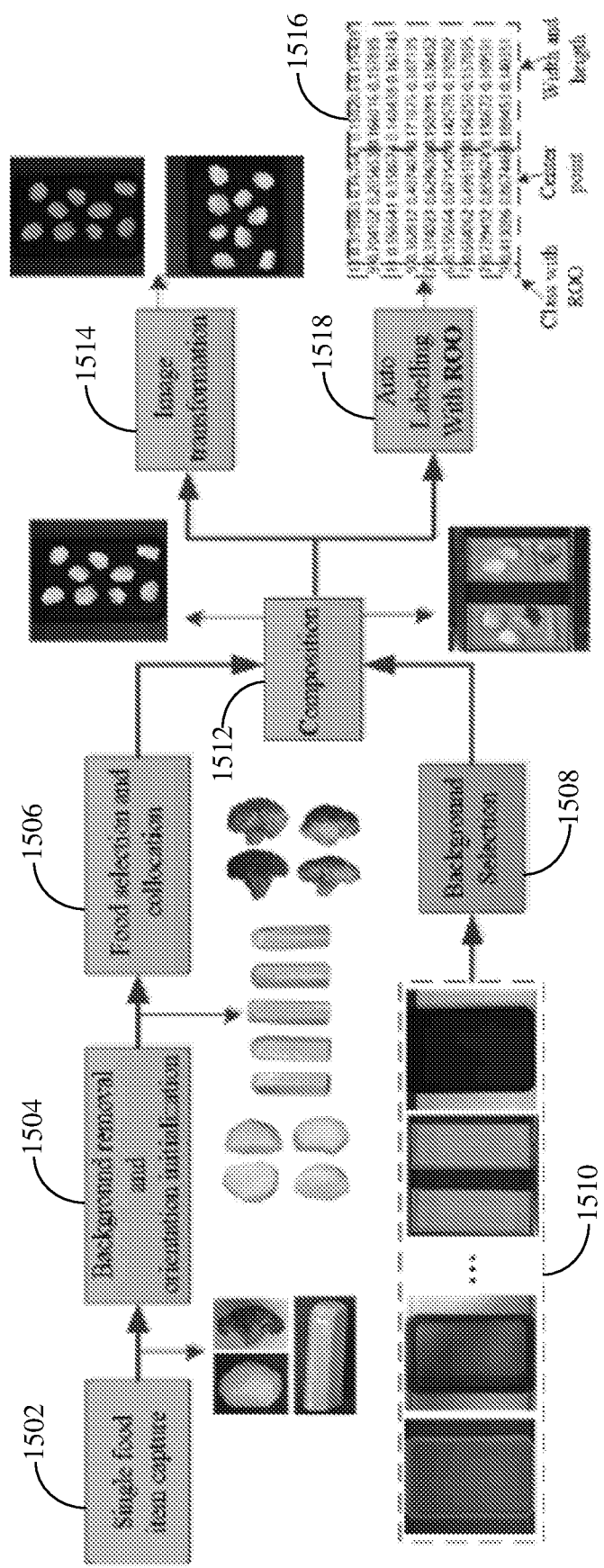
FIG. 15 depicts an illustration of automatic generation of synthetic images of piles of objects with randomized position and orientation on different backgrounds in accordance with the present embodiments.

Besides the existed arrangements collected manually, the synthetic images of a pile of objects with randomized position and orientation on different backgrounds are generated automatically. As depicted in the illustration 1500 of FIG. 15, synthetic images generated by the combination of different objects and background. The original images of different types of items and background images are captured separately 1502. The background is removed by cropping the single item from the background and orientation is initialized 1504. Then, the food is selected and their images collocated 1506. A background is selected 1508 from collected background data 1510 and the images of the food are integrated 1512 with the selected background to arrange the food objects in random poses on the selected background by image transformation 1514 to increase the number of synthetic images by image manipulation techniques. Annotation files 1516 are automatically generated (significantly reducing manual cost) to include the position and orientation of the items at the same time with the ROO information labelled 1518 into the image. These synthetic images create a great number of new images with diverse scenarios, making the dataset more robust.

Figure 16:
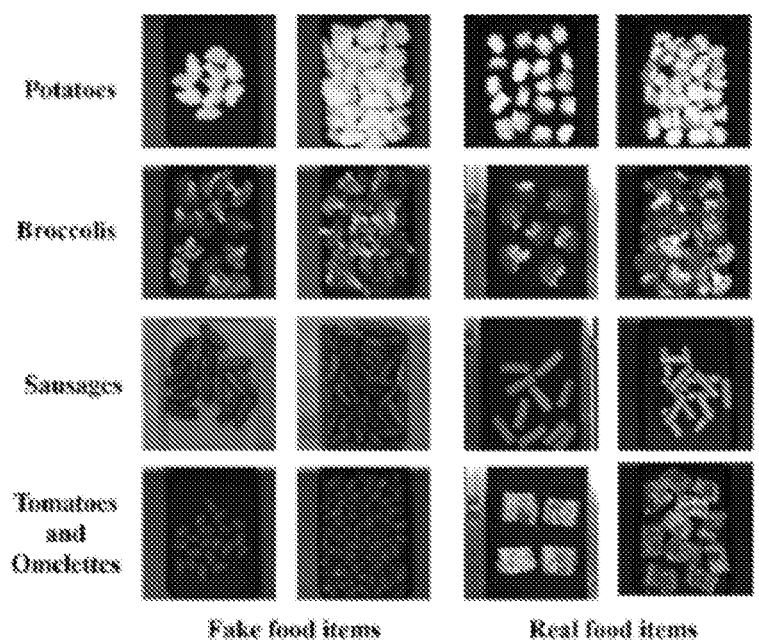
FIG. 16 depicts an illustration of food item image samples of five food categories from the image dataset generated in accordance with the present embodiments.

The FdIngred328 dataset comprises five categories of food with potato, tomato, broccoli, sausage, and omelette. Both fake food and real food are contained in the dataset due to the perishability of food items. Some samples of different arrangements for every category are shown in the illustration 1600 of FIG. 16. There are three types of collection of the food items: separate, one-layer pile, and multi-layer piles in both fake and real objects. Each row in the illustration 1600 displays a type of food including potatoes, broccolis, sausages, tomatoes, and omelettes. The left two columns show fake food items with one layer and multi-layer arrangements, while real food items are shown in the right two columns. Compared to the fake food with limited shapes, real food items present ever-changing shapes.

The prior knowledge regarding the ROO is added in the annotation files 1516 and is employed in the further pose estimation. The ROO indicates a rough orientation of the item depending on the type of food. The 2D plane is divided into eight labels (i.e., 0, 45, 90, 135, 180, 225, 270, and 315) and the correspondence is displayed in Table 2.

TABLE 2

LABEL INDICATION OF RANGE
OF ORIENTATION (IN DEGREE)

| Range of orientation (°) | Label |
|---|---|
| 355~5 | 0 |
| 5~85 | 45 |
| 85~95 | 90 |
| 95~175 | 135 |
| 175~185 | 180 |
| 185~265 | 225 |
| 265~275 | 270 |
| 275~355 | 315 |

It is notable that such labels would be reduced by half if it is a symmetric object, where the labels within 180 degrees will remain to represent the direction. In this case, ROO gives a basis of an estimation of actual direction.

For automatic handling system in a robotic system, the position, as well as the orientation of the selected item, is vital for robotic grasping. In accordance with the present embodiments, a Fast Image to Pose Detection (FI2PD) method searches for the space information of items. The pose determination method consists of two stages 1705, 1710 as shown in the illustration 1700 of FIG. 17. The first stage 1705 builds an object detector under a CNN framework. With the collected data, a CNN model is adopted to classify the food items. Prior knowledge such as ROO is provided in the annotation for training process. In the second stage 1710, a pose retrieval stage, the categories combining with ROO as well as 3D information are adopted in the estimation of pose.

In the first stage of real-time detection, only the 2D RGB images 1712 are adopted as the input of the CNN framework 1714. The outcome of the CNN framework is bounding boxes and category probabilities 1716 of all detected items including: class, center coordinate, and the category probabilities. The prior knowledge is considered in the class information which contains not only the food type but also the ROO 1718. The CNN model 1714 can be any appropriate CNN framework. In accordance with the present embodiments, the CNN model 1714 employs a YOLOv4 algorithm based on a Darknet framework since it has been demonstrated to provide state-of-art performance on 2D object recognition tasks especially on small objects via considering BoF (bag of freebies) and several BoS (bag of specials). Firstly, the network divides each image into 64×64 grids. Each grid holds candidate boxes with different sizes. The grid is selected to detect the object when the center of this object ground truth lies in the grid.

Then, the features are extracted through the convolutional layer and the final bounding boxes of possible objects are predicted through the yolo layer, which are able to predict the bounding boxes, class and its confidence scores 1716, as well as the ROO 1718.

In the second stage 1710, the bounding boxes, class and its confidence scores 1716, as well as the ROO 1718 is considered to recover the 6D pose 1724. A summary of a strategy of pose retrieval 1722 in accordance with present embodiments is listed in Algorithm 1.

ALGORITHM 1
Algorithm 1: Pose Retrieval

Input : ROO, B and D
Output : Q
1:     Notations
2:     ROO:: Range of orientation
3:     B, D: sets of bounding boxes and Point cloud
4:     Bounding box contains class, position and size of bounding boxes
5:     Q : Quaternion of the target
6:     procedure
7:       *Find bounding box of highest object based on CNN model
8:       B ← HighestSelect(B, D)
9:       *Complete the three key points of Highest item
10:    C, $P_1$, $P_2$ ← KeyPointSelect(B,D,ROO)
11:    Q ← QuaternionCo($P_1$, $P_2$)
12:    end procedure After all the possible items have been detected from stage one 1705, the highest item is considered as the most interesting target and picked from the candidates. The predicted ROO 1718 and bounding box 1716 are applied to determine two key points of the selected items. The key points are at the 0.4 and 0.6 of the line following direction indicated by the ROO 1718, and used to derive the Quaternion of the object. In this process, the 3D point cloud information is used for the two key points and the center of the object, which can greatly reduce a large amount of searching and calculation time. This information is combined with the depth map 1720 considered to calculate the 6D pose 1724 by the pose retrieval process 1722.

Some experiments were conducted to evaluate the performance of the pose estimation method in accordance with the present embodiments as well as the dataset setup. The data distribution is shown in Table 3.

TABLE 3

DATA DISTRIBUTION OF BOTH ORIGINAL
AND GENERATED IMAGES

| | Original Food Data | | Generated |
|---|---|---|---|
| Categories | Fake Food | Real Food | Food Data |
| Potato | 205 | 145 | 1450 |
| Sausage | 370 | 77 | 1367 |
| Broccoli | 200 | 147 | 1441 |
| Tomato | 164 | / | 492 |
| Omelette | / | 275 | 1225 |

After data augmentation, the final FdIngred328 dataset in accordance with the present embodiments includes five categories of food with 6425 images for training and validation and 1133 images for testing. The number of entries in the dataset were increased through basic image manipulation including image rotation and color conversion and synthetic techniques. In the synthetic process, different food items were placed in one layer separately in known position and rotations. The food models were managed to be configured in a similar size based on different background. Therefore, 4749 augmented images and the corresponding annotations were created through basic manipulation of the original data. Simultaneously, 1280 synthetic images were generated by the combination of different objects and background and the rotation of the objects. These augmented images were also used to make the balance of each class size which is of great concern in deep learning methods, while the size of tomato is less than other categories due to the crowding level of tomatoes in one image (e.g., as in the image 1310 (FIG. 13)).

Figure 18:
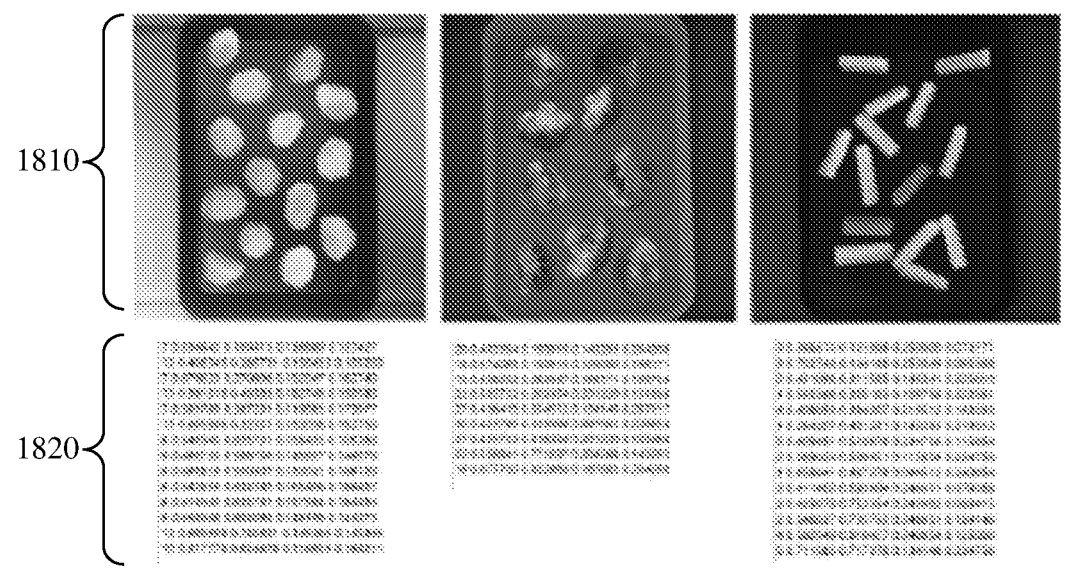
FIG. 18 depicts an illustration of synthetic data generated in accordance with the present embodiments.

Referring to the illustration 1800 of FIG. 18, synthetic data is depicted to exhibit the generated images 1810 and the generated annotations 1820. The position and orientation of the items in the images 1810 are randomly placed but known, which are reflected in the annotations 1820 via the bounding boxes and ROO information.

Figure 19:
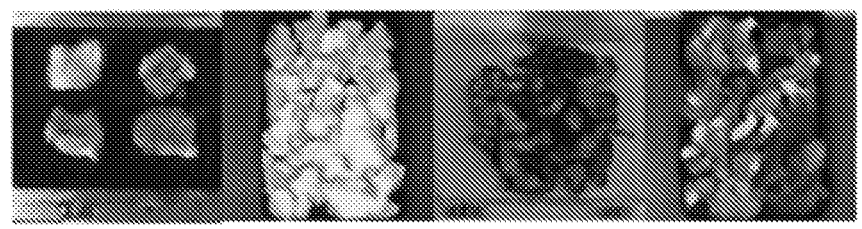
FIG. 19 depicts an image of data augmentation results in accordance with the present embodiments.

The image 1900 of FIG. 19 gives the results of data augmentation via DCGAN after 672400 iteration times. The input images are the fake food with the resolution of 328*328.

Figure 17:
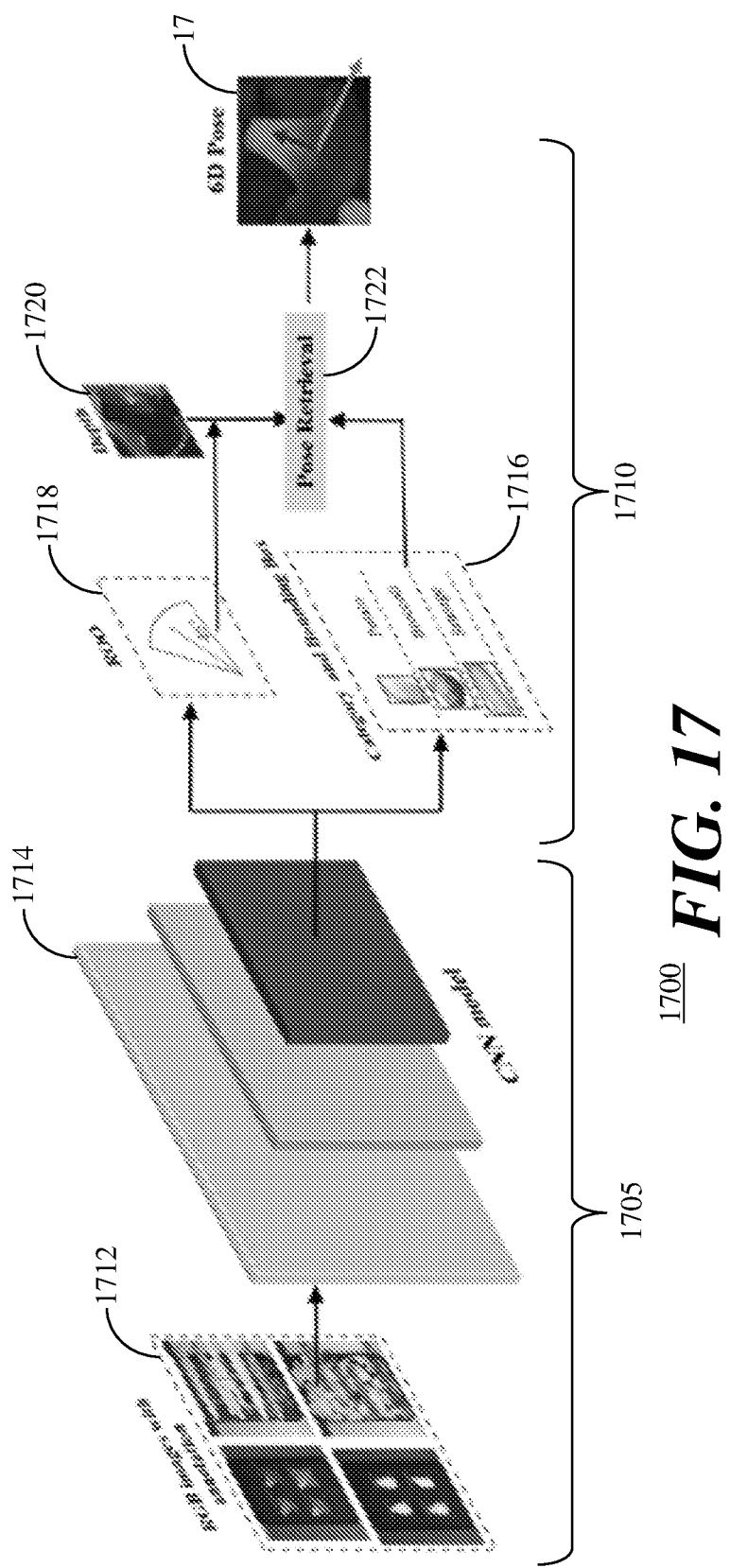
FIG. 17 depicts an illustration of an architecture for a pose estimation process in accordance with the present embodiments.

As described hereinabove in regards to FIG. 17, a synthetic dataset including both original and generated food images and the prior knowledge is adopted. After training the dataset, the CNN model predicts the object class, bounding boxes, and ROO, which are used to calculate the quaternion of the selected food items with the depth information from 3D point cloud following Algorithm 1. Due to ROO 1718, only a depth 1720 of three points is required.

The capability of the FI2PD method for object detection and 6D pose estimation of different types of food at the same time in accordance with the present embodiments was tested. The algorithm was implemented on a standard workstation with the following configuration: having a memory of 64 GB, using an Intel® Core™ 19-9900K processor as a central processing unit (CPU) at 3.6 GHz, a Quadro RTX 4000 graphics processing unit (GPU), and an Ubuntu 16.04 operating system.

Figure 20:
FIG. 20 depicts an image of results of real-time object detection and pose calculation in accordance with the present embodiments.

The image 2000 of FIG. 20 presents the results of real-time object detection and pose calculation. Four types of food are piled in separate trays and the food items in the top layer have all been detected and classified according to food type. Additionally, ROO is predicted along with the detection. The highest item is selected as the most interesting item and the 6D pose is calculated for a next process like grasping by the robotic gripper 220 (FIGS. 2 and 3). The pose calculation took 766 ms for both food recognition and pose estimation and the pose retrieval process required only 92 ms for calculation of every type of food.

The dataset and the FI2PD strategy analysis in accordance with the present embodiments was also applied into the custom-built automatic food handling system as shown in the photograph 200 (FIG. 2). The food ingredients were put in different trays and transferred into the casserole by the assistance of the Delta robot 210. Operating in real-time in accordance with the methods of the present embodiments, the food items in the trays were recognized and, simultaneously, the position and orientation of each type was determined for each run. In the real-time detection process, the image and the 3D point cloud acquired by the RGBD camera 340 (a ZIVID camera from Zivid Inc. of Oslo, Norway) were employed. For each handing process, the highest item was selected first based on their coordinates in the robotic system, thereby highly reducing the searching time. The coordinates are transferred from object coordinate system. The total performance of detection and grasping on the potato and the broccoli dataset was tested and, after 144 times picking, the success rate of grasping was 97.9%.

Thus, it can be seen that the present embodiments provide methods and systems for improved, robust, real-time robotic meal assembly with reduced time and increased accuracy. A 6D pose estimation method in accordance with the present embodiments advantageously addresses scenarios where the objects with high-resemblance shapes are piled together. A dataset regarding different food ingredients has been established which contains both original data and synthetic data, the synthetic data generated through basic manipulation and synthetic techniques thereby saving much time and effort on annotation of pose datasets. Furthermore, the pose estimation method in accordance with the present embodiments constructs the 6D pose of a pile of items from RGB images directly through two steps: first, a CNN network generates object bounding box, and, second, a pose retrieval strategy which only considers three key points provides the 6D pose of the objects. Prior knowledge is added into this process to predict the rough direction to enhance the real-time capability. The experimental results prove the method can recognize all items on a top layer of a pile and calculate poses to meet the real-time requirement of food automatic assembly systems.

Thus, the present embodiments describe a system that can recognize an assortment of items with a focus on foods. There are various types of food items that the system can recognize and the system is able to recognize items which differ to some extent in appearance yet classify them as the same type. A verification is performed visually by the system to ensure the output is of a desired quality. The system is also able to automatically perform a remedy action to address instances where the quality falls below a set standard.

It is foreseeable that the described system can be utilized for automated meal-assembly applications other than that for the airline industry. For example, the system and methods in accordance with the present embodiments can be used in commercial kitchens such as those for caterers and hotels which regularly perform the manufacture of large numbers of a variety of meals. In particular, the system would be highly useful for assembling meals in the style of Japanese bento sets such as sushi bento sets because of the variety of sushi types and the slight variation within the same type.

The system can also be used for applications where automated kitting is expected, such as where multiple types of fast-moving-consumer-goods are packaged as a set, or where tools like surgical instruments are to be assembled as a kit prior to each use in a hospital or dental office.

It is foreseeable that the IAV algorithm in accordance with the present embodiments can also be utilized for various automated meal-assembly and automated kitting applications. The IAV can perform the visual inspection of these meals and kits regardless of the meal being served on a plate or a tray or the goods being kitted. The utility of the IAV algorithm will be appreciated when a number of items are to be arranged and presented in a 2D plane as a single product, and when the component items exhibit some degree of irregularity between items of the same category. Some examples of such applications include the arrangement of furniture in venues such as hotels and restaurants as well as the packing of surgical instruments into kits.

While exemplary embodiments have been presented in the foregoing detailed description of the present embodiments, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing exemplary embodiments of the invention, it being understood that various changes may be made in the function and arrangement of steps and method of operation described in the exemplary embodiments without departing from the scope of the invention as set forth in the appended claims.

What is claimed is:

1. A system for automatic kitting of items comprising:
a robotic device comprising an arm with a robotic gripper at one end;
a first imaging device focused on a device conveying kitted items;
a computing device coupled to the first imaging device and configured to process image data from the first imaging device, wherein the computing device includes item arrangement verification software configured to determine whether each item desired to be in the kitted items is present or absent in the kitted items in response to the processed image data from the first imaging device and generates data based on whether an item desired to be in the kitted items is absent from the kitted items; and
a controller coupled to the computing device to receive the data from the computing device representing whether the item desired to be in the kitted items is absent from the kitted items, the controller further coupled to the robotic device for providing instructions to the robotic device to control movement of the arm and the robotic gripper, wherein at least some of the instructions provided to the robotic device are generated in response to the item desired to be in the kitted items being absent from the kitted items,
wherein the controller controls the arm and the robotic gripper to pick an item corresponding to the item desired to be in the kitted items which is absent from the kitted items and place the picked item into the kitted items, and
wherein the computing device further includes object detection software configured to determine a type of each item in the kitted items and a position of that item in the kitted items in response to the processed image data from the first imaging device, and wherein the object detection software provides the type and position of each item present in the kitted items to the item arrangement verification software to determine whether each item desired to be in the kitted items is absent from the kitted items.

2. The system in accordance with claim 1 wherein the at least some of the instructions provided to the robotic device by the controller comprise one or more instructions to pick an item corresponding to the item desired to be in the kitted items which is absent from the kitted items and place the picked item into the kitted items.

3. The system in accordance with claim 1 wherein the item arrangement verification software is further configured to flag the kitted items for manual postprocessing in response to determining that an item in the kitted items is not positioned correctly.

4. The system in accordance with claim 1 wherein the system is a meal assembly system for automatic kitting of food items.

5. The system in accordance with claim 1 further comprising a second imaging device coupled to the computing device and focused on a device conveying items to be kitted.

6. The system in accordance with claim 5 wherein the items on the device conveying items to be kitted are conveyed in trays, and wherein the second imaging device comprises depth sensing capability to enable the robotic gripper and the arm to pick an item from the trays.

7. The system in accordance with claim 5 wherein the computing device is further configured to generate image data corresponding to predefined poses related to a type of item in response to a plurality of backgrounds and a plurality of poses of the item.

8. The system in accordance with claim 7 wherein the computing device is further configured to determine whether each item to be kitted is posed in accordance with one of the predefined poses corresponding to a location and a type of the item based on the type and the location received from the second imaging device.

9. The system in accordance with claim 8 wherein the computing device is configured to determine whether each item in the kitted items is posed in accordance with one of the predefined poses based on a small bounding box related to the location and the type of the item.

10. The system in accordance with claim 9 wherein the system is further configured to determine the small bounding box related to the location and the type of the item based on an original bounding box defined by a correct pose of the type of the item at the location which has been shrunk based on an adjustable tolerance factor.

11. The system in accordance with claim 10 wherein the generated image data further comprises labelled data, the labelled data comprising a range of orientation (ROO) for providing a rough direction to enable fast determination whether each item in the items to be kitted is posed in accordance with one of the predefined poses corresponding to the item to be kitted.

12. The system in accordance with claim 11 wherein the labelled data further comprises center point information and width and length information.

13. The system in accordance with claim 11 wherein the object detection software is configured to determine the type of each item in the kitted items and the position of that item in the kitted items by building a convolutional neural network (CNN) object detector model to classify the items in response to the processed image data from the second imaging device.

14. The system in accordance with claim 13 wherein the object detection software is further configured to determine the pose of the item in the device conveying items to be kitted in response to category and bounding box information and range of orientation (ROO) information received from the classification by the CNN object detector model.

15. The system in accordance with claim 14 wherein the pose is a six-dimensional (6D) pose, and wherein the object detection software is configured to determine the 6D pose of the item in the kitted items further in response to depth map information.

16. A robotic method for automatic kitting of items comprising:
imaging kitted items to generate first image data;
determining whether each item desired to be in the kitted items is present or absent in the kitted items in response to the first image data, comprising determining a type of each item in the kitted items and a position of that item in the kitted items in response to the first image data;
generating data based on whether an item desired to be in the kitted items is absent from the kitted items in response to the type and the position of each item present in the first image data;
generating robotic control instructions in response to the item desired to be in the kitted items being absent from the kitted items; and
providing the robotic control instructions to a robotic device, such that the robotic device controls movement of an arm and a robotic gripper of the robotic device to pick an item corresponding to the item desired to be in the kitted items which is absent from the kitted items and place the picked item into the kitted items.

17. The method in accordance with claim 16, further comprising flagging the kitted items for manual postprocessing in response to determining that an item in the kitted items is not positioned correctly.

18. A non-transitory computer readable medium comprising instructions for automatic kitting of items in a robotic system, the instructions causing a controller in the robotic system to:

image kitted items to generate first image data;

determine whether each item desired to be in the kitted items is present or absent in the kitted items in response to the first image data, comprising determining a type of each item in the kitted items and a position of that item in the kitted items in response to the first image data;

generate data based on whether an item desired to be in the kitted items is absent from the kitted items in response to the type and the position of each item present in the first image data;

generate robotic control instructions in response to the item desired to be in the kitted items being absent from the kitted items; and provide the robotic control instructions to a robotic device, such that the robot device controls movement of an arm and a robotic gripper of the robotic device, wherein the robotic control instructions comprise one or more instructions to pick an item corresponding to the item desired to be in the kitted items which is absent from the kitted items and place the picked item into the kitted items.

* * * * *